United States Patent
Stapfer

[11] 3,846,459
[45] Nov. 5, 1974

[54] ORGANOTIN MERCAPTOCARBOXYLATES
[75] Inventor: Christian H. Stapfer, Aachen, Germany
[73] Assignee: Cincinnati Milacron Chemicals, Inc., Reading, Ohio
[22] Filed: Oct. 18, 1972
[21] Appl. No.: 298,543

[52] U.S. Cl. ......... 260/429.7, 260/2 M, 252/431 C, 260/75 R, 424/288
[51] Int. Cl. ............................................. C07f 7/22
[58] Field of Search ................................. 260/429.7

[56] References Cited
UNITED STATES PATENTS

| | | | |
|---|---|---|---|
| 2,832,750 | 4/1958 | Weinberg et al. | 260/429.7 |
| 3,396,185 | 8/1968 | Hechenbleikner | 260/429.7 |
| 3,478,071 | 11/1969 | Weisfeld | 260/429.7 |
| 3,505,370 | 4/1970 | Hoch | 260/429.7 |
| 3,630,992 | 12/1971 | Brecker | 260/429.7 |
| 3,631,082 | 12/1971 | Kino | 260/429.7 |
| 3,697,566 | 10/1972 | Sassa et al. | 260/429.7 |

OTHER PUBLICATIONS
Sawyer, Organotin Compounds, Marcel Dekker, N.Y., N.Y., 1971, Vol. 2, pp. 254–257.

*Primary Examiner*—Daniel E. Wyman
*Assistant Examiner*—A. P. Demers
*Attorney, Agent, or Firm*—Cushman, Darby & Cushman

[57] ABSTRACT

There are prepared monohydrocarbyltin mercaptocarboxylates of the formula

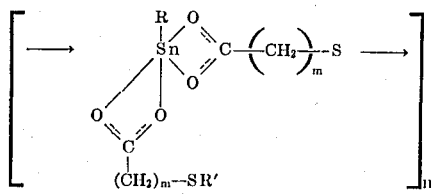

and trihydrocarbyltin mercaptocarboxylates of the formula

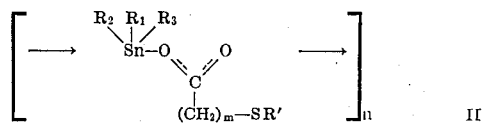

where R, $R_1$, $R_2$ and $R_3$ are alkyl, aralkyl or aryl, R' is H, Na, K or

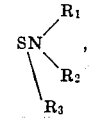

$n$ is 1 to ∞ and $m$ is 1 to 3.

The compounds are useful as catalysts in polymerization, e.g. in forming polyesters, and as biocides, e.g. as fungicides and bactericides.

17 Claims, No Drawings

ORGANOTIN MERCAPTOCARBOXYLATES

This invention relates to the preparation of novel monohydrocarbyltin mercaptocarboxylates and trihydrocarbyltin mercaptocarboxylates.

The monohydrocarbyltin mercaptocarboxylates have the formula

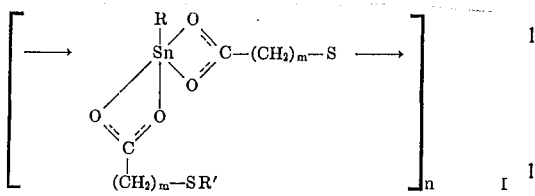

and the trihydrocarbyltin mercaptocarboxylates have the formula

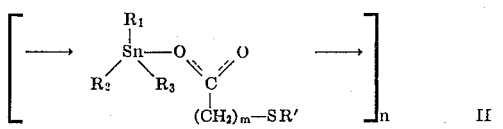

where R, $R_1$, $R_2$ and $R_3$ are alkyl, e.g. methyl, ethyl, propyl, butyl, sec. butyl, amyl, hexyl, cyclohexyl, octyl, decyl dodecyl or aryl, e.g. phenyl, p-tolyl, o-tolyl or m-phenyl or aralkyl such as benzyl. R' is H, Na, K or

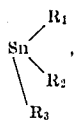

$n$ is 1 to $\infty$ and $m$ is 1 to 3. When the compounds are polymers, $n$ is usually greater than 2 and can be $\infty$.

Thus, n-butylstannonic acid reacts readily with mercaptoacetic acid to form a one tin to two mercaptoacid reaction product as follows:

$$\underset{\underset{OH}{|}}{\overset{\overset{n-C_4H_9}{|}}{Sn}}=O + 2HS-CH_2-COOH \xrightarrow{-H_2O}$$

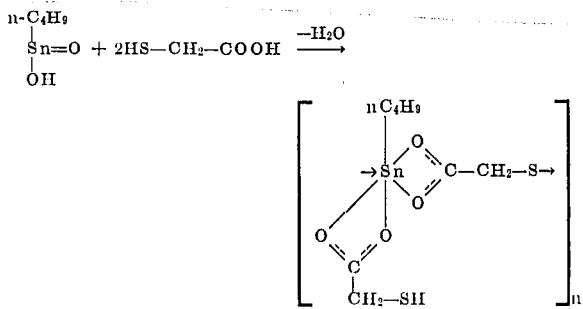

Structural elucidation of this compound by infrared and Mössbauer spectroscopies show unambiguously a single tin site whereby each tin atom is hexacoordinated, accomodating two bidentate carboxylate ligands, one unidentate sulfur ligand and one Sn—C linkage.

The compounds of formula I where R' is H can be further reacted with sodium or potassium methoxide, e.g. on a 1 to 1 mole basis, to form the corresponding mercaptides or with a trihydrocarbyltin halide or trihydrocarbyltin oxide to form the corresponding organotin mercaptide. As such trihydrocarbyltin halides there can be used trimethyltin chloride, triethyltin bromide, tripropyltin chloride, tributyltin chloride tri sec. butyltin chloride, triamyltin chloride, ethyl propyl butyl tin chloride, trihexyltin chloride, tri 2-ethylhexyltin chloride, tribenzyltin chloride, trioctyltin chloride, tris decyltin chloride, tris dodecyltin chloride, tribenzyltin chloride, triphenyltin chloride, tri o-tolyltin chloride, tri m-tolyltin chloride, tri p-tolyltin chloride. As the trihydrocarbyltin oxides there can be used bis (trimethyltin) oxide, bis(triethyltin) oxide, bis(tripropyltin) oxide, bis (tributyltin) oxide, bis (ethyl propyl butyltin) oxide, bis (tri sec. butyltin) oxide, bis (triamyltin) oxide, bis(trihexyltin) oxide, bis(tricyclohexyltin) oxide, bis(tribenzyltin) oxide, bis(tri octyltin)oxide, bis (tri 2-ethylhexyltin) oxide, bis (tri isooctyltin) oxide, bis(tris decyltin) oxide, bis (tris dodecyltin) oxide, bis (triphenyltin) oxide, bis(tri-p-tolyltin) oxide, bis (tri o-tolyltin) oxide.

In making the compounds of formula I as the mercaptoacid there can be used mercaptoacetic acid, beta mercaptopropionic acid and gamma mercaptobutyric acid. In place of the butylstannoic acid there can be used methylstannoic acid, ethylstannoic acid, propylstannoic acid, isopropylstannoic acid, sec. butylstannoic acid, amylstannoic acid, hexylstannoic acid, cyclohexylstannoic acid, octylstannoic acid, 2-ethylhexylstannoic acid, isooctylstannoic acid, decylstannoic acid, dodecylstannoic acid, phenylstannoic acid, p-tolylstannoic acid, m-tolylstannoic acid, o-tolylstannoic acid.

Monohydrocarbyltin trihalides when reacted in the proper ratio of mercaptoalkanoic acid (mercaptoacetic acid, mercaptopropionic acid and/or mercaptobutyric acid), i.e. 1 mole of organotin trihalide to 2 moles of mercaptoalkanoic acid lead to the same polymeric compound containing one free SH group. As the organotin trihalides there can be used for example methyltin trichloride, ethyltin trichloride, propyltin trichloride, butyltin trichloride, butyltin tribromide, secbutyltin trichloride, amyltin trichloride, hexyltin trichloride, octyltin trichloride, isooctyltin trichloride, 2-ethylhexyltin trichloride, benzyltin trichloride, decyltin trichloride, dodecyltin trichloride, phenyltin trichloride, p-tolyltin trichloride. Trihydrocarbyltin oxides react in two different ways with mercaptocarboxylic acids according to the relative ratio of the starting materials. If that ratio is 1:1, a monomeric, binuclear organotin mercaptocarboxylate is obtained according to the following sequence:

$$\underset{\underset{R_2}{|}}{\overset{\overset{R_1}{|}}{R_3Sn}}-O-\underset{\underset{R_2}{|}}{\overset{\overset{R_1}{|}}{SnR_3}} + HS-CH_2-COOH \xrightarrow{-H_2O}$$

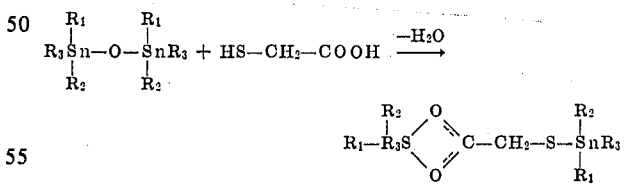

The elemental analysis of such compounds indicates a two tin per sulfur ratio, their infrared spectra show a strong absorption at 1630 cm$^{-1}$, characteristic of organotin carboxylates where the ligand is bidentate through both oxygen atoms, as well As the absorption at 350 cm$^{-1}$, characteristic of the Sn—S stretching vibration. The Mössbauer spectroscopy reveals two distinct tin sites, one corresponding to the pentacoordinated carboxylate tin, the other to the tetracoordinated mercaptide tin. If the ratio of reagents is 1:2, the structure of the resulting product is considerably modified:

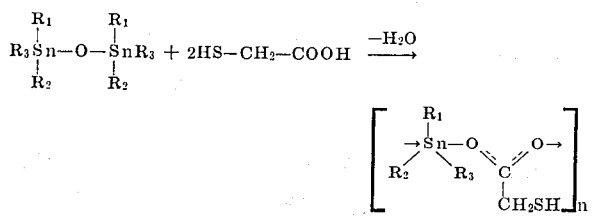

Only one tin site is revealed by Mössbauer spectroscopy with no evidence of tin-sulfur bonding in the infra-red spectrum. The carboxylate absorption has shifted from 1630 to 1550 cm$^{-1}$ in the infrared, indicating a reduced steric hindrance of the bidentate carboxylate which now assumes a linear, polymeric and bridging character similar to that observed with trialkyltin acetates. Again, the trihydrocarbyltin-mercaptocarboxylates of such structure can further be reacted with sodium or potassium methoxides as well as with organotin oxides to yield the corresponding metal or organometal mercaptides.

Trihydrocarbyltin halides also react with mercaptocarboxylic acids to form mixtures of the two structural features described above, this regardless of the quantitative ratio. Organic ω-mercaptocarboxylic acids suitable for the purpose of this invention include mercaptoacetic acid, β-mercaptopropionic acid and γ-mercaptobutyric acid.

As the trihydrocarbyltin chlorides there can be used any of those mentioned above. Likewise as the trihydrocarbyltin oxide there also can be used any of those set forth above.

The general experimental procedure for carrying out the condensation reactions described above to form the compounds of formula I and II consists in reacting the organostannoic acid or organotin oxide and mercaptoalkanoic acid in the indicated proportions until quantitative amounts of condensation water have been removed. The reaction can be carried out at any convenient temperature, e.g. 25 – 150°C. While it is not necessary to employ a solvent preferably there is present a hydrocarbon solvent and the reaction is conveniently carried out at reflux and the quantitative amounts of condensation water removed as an azeotrope. Typical hydrocarbon solvents include pentane, hexane, octane, decane, tetralin, benzene, toluene, xylene, petroleum ether and aromatic naphtha.

The same procedure may be used where a hydrocarbon solution of the organotin halides is used in place of the oxides, this time in presence of a suitable HCl acceptor such as sodium bicarbonate, potassium bicarbonate, triethylamine. The monohydrocarbyltin mercaptocarboxylates of the invention have been found to be excellent polymerization and polycondensation catalysts in the manufacture of saturated and unsaturated polymers of the polyester type.

Thus they can be used in an amount of 0.05 – 1% as catalysts for forming polymeric esters such as the reaction product of a glycol such as ethylene glycol, 1,8-octanediol, cyclphexane-dimethanol with azelaic acid, terephthalic acid, adipic acid, sebacic acid. The monohydrocarbyltin and mercaptocarboxylates of formula I and especially the trihydrocarbyltin mercaptocarboxylates of formula II also are biologically active and can be used as biocides for the protection of paints, coatings, wood and textiles, e.g. of cotton, rayon, cellulose acetate or wool against bacterial and fungal growth. Thus they can be used against such organisms as Escheria coli, Aspergillus niger, Aspergillus flavus, Staphylococcus ameus, Pythium spp., Chaetomium Globosum, Rhizoctonia, Fusarium, Helminthosporium, Stemphyllium sarcenaeformal, Anthrax bacillus, pneumococcus, etc.

Those compounds containing terminal sodium mercaptide or potassium mercaptide groups are to a large extent water soluble or water dispersable which facilitates the formulation of water base paints which can be protected against bacteria and fungi.

Unless otherwise indicated all parts and percentages are by weight.

Example 1

A suspension of 19.3 g (0.1 mol) of n-butyl stannoic acid in 250 ml of toluene was kept under agitation at reflux and 18.4 g (0.2 ml) of mercaptoacetic acid was added slowly. Upon recovery of 3.6 ml of condensation water, the precipitated reaction product was filtered, washed with acetone and dried. The resulting 35 g of a fine, white, insoluble amorphous solid represented a quantitative yield of poly (n-butyltin-dimercaptoacetate) melting with decomposition at 270°C. Anal. Calcd for $[C_8H_{14}O_4S_2Sn_n]_n$ C,26.91;H, 3.95; O 17.93; S, 17.97,Sn,33.25 Found: C,26.88; H,4.01; O, 17.65; S,18.11; Sn, 33.18., formula $[(C_4H_9)Sn(OOCCH_2SH)(OOCCH_2S)]_n$

Example 2

A solution of 29.8g (0.5 ml) of bis tri-n-butyltin oxide in 100 ml of toluene was added slowly to a refluxing suspension of 35.6g (0.1 mol) of poly (n-butyltin-dimercaptoacetate) in 200 ml of toluene. Upon azotropic elimination of 1.8 ml of water, 63 g of poly (tri-n-butyltinthiomethyl carboxy-n-butylmercaptoacetate) was obtained. This compound is a white amorphous solid, with low solubility in organic solvents melting with decomposition at 172–180°C. Anal. calcd for $C_{20}H_{40}O_4S_2Sn_2$ $_n$ C,37.24; H,6.25; O,9.92; S,9.94; Sn, 36.80. Found: C,37.08; H,6.19; O,10.06; S,9.90; Sn,37.05.

Example 3

A solution of 9.3 g (0.1 mol) of mercaptoacetic acid in 50 ml of toluene was added to a refluxing solution of 59.6 g (0.1 mol) of bis (tri-n-butyltin) oxide in 100 ml of toluene. The reaction mixture was kept at reflux for one hour or until 1.8 ml of condensation water was recovered. The toluene was removed by flash evaporation and the 67 g of residual colorless liquid represented a quantitative yield of bis(tri-n-butyltin) mercaptoacetate, decomposing rapidly when heated above 150°C under vacuum $n_D^{20}$=1.5097 Anal. Calcd. for $C_{26}H_{56}O_2S$ $Sn_2$: C,46.80; H,8.46; O,4.75; S,4.80; Sn, 35.13; mol. weight, 670. Found: C, 46.60; H,8.40; O,4.73; S,4.59; Sn, 34.88; mol. weight, 654.

Example 4

A mixture of 51.2 g (0.1 mol) of bis (tri-n-propyltin) oxide and 18.6 g (0.2 mol) of mercaptoacetic acid was kept under agitation at 115°C for 2 hours. The mixture was thoroughly sparged with nitrogen in order to eliminate residual condensation water. Upon collection of 1.8 ml of water in a trap, the residual 68 g. of clear liquid slowly solidified when cooled and represented a quantitative yield of poly(tri-n-propyltin mercaptoacetate) melting at 105–110°C. Anal. Calcd for $C_{11}H_{24}O_2S$ Sn; C, 38.97; H,7.13; O,9.43; S,9.45; Sn, 35.01; mol. weight, 339. Found: C,38.35; H,6.71; O,9.25; S,11.29; Sn 35.70 mol. weight, 1348.

Example 5

A suspension of 26.9 g (0.1 mol) of poly (trimethyltin mercaptopropionate), (prepared according to the general procedure of example 4 by reacting 0.1 mol of bis (trimethyltin) oxide with 0.2 mol of gamma mercaptopropionic acid and having a molecular weight of about 1298), in 100 ml of n-hexane was maintained at reflux and under agitation while a solution of 5.4 g (0.1 mol) of sodium methoxide was slowly added. A fluffy precipitate formed gradually which upon filtration after one hour of reflux yielded 29 g of the corresponding water soluble sodium mercaptide. The sodium-sulfur bond can then be titrated quantitatively with iodine or potassium iodate. Anal. Calcd for $C_6H_{13}O_2$ S Na Sn: C, 24.77; H, 4.50; O, 10.99; S, 11.02; Na, 7.90; Sn, 40.80. Found: C, 24.56; H, 4.66; O, 11.05; S, 11.29; Na, 8.02; Sn 40.97.

Example 6

A mixture of 71.6 g (0.1 mol) of bis (phenyltin) oxide and 18.6 g (0.2 mol) of mercaptoacetic acid was kept under agitation at 125°C for 3 hours. The mixture was kept under nitrogen atmosphere while 1.8 ml of condensation water was collected in a trap. Upon cooling, 70 g of a white crystalline which represented a quantitative yield of poly (triphenyltin mercaptoacetate) melting at 125°C. Anal. Calcd for $C_{19}H_{18}O_2S$ Sn: C,52.69; H, 4.19; O, 7.39; S, 7.39; Sn, 27.41; mol. weight .433. Found: C, 53.02; H, 4.11; O, 7.55; S, 7.98; Sn, 28.00; mol. weight 1458.

The utility of the compounds of the invention is illustrated by the following examples.

Example 7

Polyoctylene glycol azelate was prepared by reacting 1 mole of 1,8-octanediol with 1 mole of azelaic acid at 150°C. in the presence of 0.3% of p-toluene sulfonic acid as a catalyst. Quantitative condensation of water, indicating the completion of the polyesterification, could never be obtained with this catalyst even after several hours of reaction. The experiment was repeated using 0.3% of poly (trimethyltin mercaptopropionate) as the catalyst and the polycondensation reaction was completed after 1 hour.

In place of the poly (trimethyltin mercaptopropionate) there can be used any of the other compounds within formulae I and II as the catalyst.

Example 8

Tests for the mildew resistance imparted by fungicides were carried out according to Federal Specification CCC-T-191 method 5751-1 (May 6, 1953) as follows: Solutions of 10%, 5%, 6% and 2% respectively of bis (tri-n-butyltin) mercaptoacetate in methylethyl ketone were prepared and a piece of untreated cotton cloth was dipped in each solution for several minutes to deposit a sufficient quantity of fungicide. A piece of the same cloth was left unprotected and used as a control. The test samples were then air dried and placed with the control on a nutrient agar inoculated with the organism Chaetomium Globosum. During a 14 day incubation at 30°C., the control failed after 7 days while the treated samples passed the 14 day test at all levels while inhibiting all fungus growth.

In place of the bis(tri-n-butyltin) mercaptoacetate there can be used any of the other compounds within formulae I and II as the fungicide.

What is claimed is:

1. A monohydrocarbyltin mecaptocarboxylate compound of the formula:

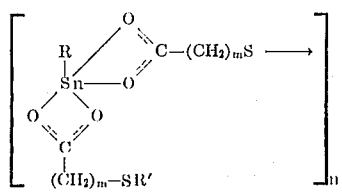

wherein:
R' is H, Na, K or

R, $R_1$, $R_2$ and $R_3$ are alkyl, aralkyl or aryl;
$n$ is an integer of at least 1; and
$m$ is 1 to 3.

2. A monohydrocarbyltin mercaptocarboxylate compound of the formula:

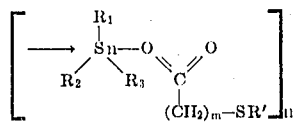

wherein:
R' is H, Na, K or

where $R_1$, $R_2$, and $R_3$ are alkyl, aralkyl or aryl;
$n$ is an integer of at least 1; and
$m$ is 1 to 3.

3. A compound according to claim 1 wherein R is lower alkyl or phenyl and R' is H, Na, K or

wherein $R_1$, $R_2$ and $R_3$ are lower alkyl or phenyl.

4. A compound according to claim 3 wherein R' is H, Na or K.

5. A compound according to claim 4 wherein R' is H.

6. A compound according to claim 5 wherein R is n-butyl, $m$ is 1 and $n$ is an integer of greater than 2.

7. A compound according to claim 3 wherein $m$ is 1 or 2.

8. A compound according to claim 1 wherein R is lower alkyl or phenyl and R' is

and $R_1$, $R_2$ and $R_3$ are lower alkyl or phenyl.

9. A compound according to claim 8 where R is methyl, R' is tri-n-butyltin, $m$ is 2 and $n$ is greater than 2.

10. A process for making a compound of claim 1 comprising reacting one mole of RSnOOH with 2 moles of a mercaptoalkanoic acid of the formula $HS(CH_2)_mCOOH$.

11. A process according to claim 10 wherein $R_1$ is H and R is lower alkyl or phenyl.

12. A compound according to claim 2 wherein $R_1$, $R_2$ and $R_3$ are lower alkyl or phenyl.

13. A compound according to claim 12 where R' is

and $n$ is 1.

14. A compound according to claim 13 wherein $m$ is 1 or 2 and $R_1$, $R_2$ and $R_3$ are all lower alkyl.

15. A compound according to claim 14 wherein $m$ is 1, R' is butyl and $R_1$, $R_2$, $R_3$ are butyl.

16. A process of preparing a compound according to claim 13 comprising reacting one mole of a compound having the formula

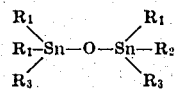

with one mole of a compound having the formula $HS(CH_2)_mCOOH$.

17. A process for preparing a compound according to claim 2, wherein $R_1$, $R_2$ and $R_3$ are lower alkyl or phenyl and R' is H, Na or K comprising reacting one mole of a compound having the formula:

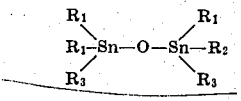

with 2 moles of a compound having the formula $HS(CH_2)_mCOOH$.

* * * * *